United States Patent
Rajagopalan et al.

(10) Patent No.: US 11,133,664 B2
(45) Date of Patent: Sep. 28, 2021

(54) SOLID STATE PROTECTION CIRCUITS FOR A CONVERTER CIRCUIT

(71) Applicant: Halliburton Energy Services, Inc., Houston, TX (US)

(72) Inventors: Satish Rajagopalan, Tomball, TX (US); Jonathan Peter Zacharko, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 282 days.

(21) Appl. No.: 15/777,976

(22) PCT Filed: Jan. 22, 2016

(86) PCT No.: PCT/US2016/014550
§ 371 (c)(1),
(2) Date: May 22, 2018

(87) PCT Pub. No.: WO2017/127112
PCT Pub. Date: Jul. 27, 2017

(65) Prior Publication Data
US 2018/0351349 A1    Dec. 6, 2018

(51) Int. Cl.
*H02H 7/127* (2006.01)
*H02H 7/125* (2006.01)
(Continued)

(52) U.S. Cl.
CPC ......... *H02H 7/125* (2013.01); *E21B 41/0085* (2013.01); *H02H 1/0007* (2013.01);
(Continued)

(58) Field of Classification Search
CPC .......... H02H 3/083; H02H 7/127; H02H 3/05; H02H 7/125; H02H 7/1252; H02H 7/1255;
(Continued)

(56) References Cited

U.S. PATENT DOCUMENTS

| 4,048,647 A | 9/1977 | Pickar |
| 7,777,553 B2 * | 8/2010 | Friedrichs .......... H03K 17/6871 327/436 |

(Continued)

FOREIGN PATENT DOCUMENTS

| EP | 0915348 B1 | 1/2006 | |
| FR | 1225258 A * | 6/1960 | ............. H02H 7/125 |

OTHER PUBLICATIONS

Veliadis, V; Steiner, B; Lawson, K; Bayne, S; Urciuoli, D; Ha, H; "Suitability of N-ON recessed implanted gate vertical-channel SiC JFETs for optically triggered 1200V solid-state-circuit-breakers"; Nov. 4, 2015, 2015 IEEE workshop on Wide Bandgap Power Devices and Appliances, pp. 162-165. (Year: 2015).*

(Continued)

*Primary Examiner* — Harry R Behm
(74) *Attorney, Agent, or Firm* — Benjamin Ford; Baker Botts L.L.P.

(57) ABSTRACT

An example method may include generating an alternating current (AC) output at a power source within a borehole in a subterranean formation. An electrical component may receive a direct current (DC) output from a converter circuit coupled to the power source and the electrical component. One or more measurements corresponding to the power source, the converter circuit, the electrical component, or a protection circuit coupled to the converter circuit may be received. Blocking devices within the protection circuit may be selectively caused to block current flow in the converter circuit based, at least in part, on the one or more received measurements.

14 Claims, 10 Drawing Sheets

(51) Int. Cl.
*H02M 7/219* (2006.01)
*H02H 3/05* (2006.01)
*E21B 41/00* (2006.01)
*H02H 1/00* (2006.01)
H02H 3/08 (2006.01)
E21B 47/12 (2012.01)

(52) U.S. Cl.
CPC ............. *H02H 3/05* (2013.01); *H02H 7/127* (2013.01); *H02M 7/219* (2013.01); *E21B 47/12* (2013.01); *H02H 3/083* (2013.01)

(58) Field of Classification Search
CPC .. H02H 7/1257; H02H 3/165; E21B 41/0085; H02M 7/219
See application file for complete search history.

(56) References Cited

U.S. PATENT DOCUMENTS

| | | | |
|---|---|---|---|
| 2004/0080888 A1 | 4/2004 | Gibbs | |
| 2009/0040796 A1 | 2/2009 | Lalithambika et al. | |
| 2009/0128347 A1* | 5/2009 | Bucella | H02H 11/006 340/654 |
| 2010/0277847 A1 | 11/2010 | Li | |
| 2012/0120689 A1* | 5/2012 | Rozman | H02H 7/125 363/53 |
| 2015/0070802 A1 | 3/2015 | Dong et al. | |
| 2015/0098258 A1* | 4/2015 | Park | H02H 7/1225 363/37 |
| 2015/0123625 A1 | 5/2015 | Haugan | |
| 2015/0124505 A1* | 5/2015 | Wang | H02M 1/4216 363/126 |
| 2015/0171750 A1* | 6/2015 | Zeng | H01L 27/0605 323/311 |
| 2016/0060975 A1* | 3/2016 | Gorrara | E21B 4/04 175/325.2 |
| 2016/0072422 A1* | 3/2016 | Kuroki | H02M 1/32 318/519 |
| 2016/0380429 A1* | 12/2016 | Krstic | H02J 1/00 307/77 |
| 2017/0047727 A1* | 2/2017 | Cao | H05K 7/20927 |
| 2017/0047841 A1* | 2/2017 | Zojer | H02M 1/4233 |

OTHER PUBLICATIONS

Machine Translation of FR1225258 from EPO website on Jul. 8, 20, 4 pages. (Year: 2020).*
International Preliminary Report on Patentability issued in related PCT Application No. PCT/US2016/014550 dated Aug. 2, 2018, 11 pages.
Ide, P., N. Froehleke, and H. Grotstollen. "Comparison of selected 3-phase switched mode rectifiers." Telecommunications Energy Conference, 1997. INTELEC 97., 19th International. IEEE, 1997.
Sheridan, David C., et al. "Reverse conduction properties of vertical Sic trench JFETs." Power Semiconductor Devices and ICs (ISPSD), 2012 24th International Symposium on Power Semiconductor Devices and ICs. IEEE, 2012.
International Search Report and Written Opinion issued in related PCT Application No. PCT/US2016/014550 dated Oct. 17, 2016, 12 pages.

* cited by examiner

SOLID STATE PROTECTION CIRCUITS FOR A CONVERTER CIRCUIT

CROSS-REFERENCE TO RELATED APPLICATION

The present application is a U.S. National Stage Application of International Application No. PCT/US2016/014550 filed Jan. 22, 2016, which is incorporated herein by reference in its entirety for all purposes.

BACKGROUND

This disclosure generally relates to electronic protection circuits. In particular, this disclosure relates to protection circuits comprising solid state blocking devices for use in downhole electronic circuits.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. Some or all of these steps may require electronic elements located downhole that require DC power to operate. That DC power can be provided by converting alternating current (AC) power from a downhole alternator using rectification circuitry and a capacitor bank to smooth out voltage fluctuations in the rectified signal. Many abnormal situations can present themselves due to harsh downhole conditions, including overvoltage events on alternator terminals, alternator faults, turbine-alternator coupling failures, over-temperature situations, and failures in the capacitor bank or load. These abnormal situations may cause damage to the electronic elements, which may be sensitive and/or expensive.

BRIEF DESCRIPTION OF THE DRAWINGS

These drawings illustrate certain aspects of certain embodiments of the present disclosure. They should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure describes protection circuits comprising solid state blocking devices used in hydrocarbon drilling and recovery operations. Example protection circuits may be configured to block current flow in downhole electronic circuits. The blocking devices may be switched based on the detection of fault events or abnormal conditions by one or more downhole sensors. By using protection circuits in accordance with the present disclosure, repair and maintenance costs for downhole electronics may be reduced through the prevention of damage caused by fault events or other abnormal conditions that may arise in a downhole environment. In addition, particular embodiments of the present disclosure may allow for reduced amounts of blocking devices that are required over current protection circuits for downhole applications, which typically require large numbers of active components. Although the example protection circuits described herein are used in the context of hydrocarbon drilling and recovery operations, they are not limited to this context. Instead, as would be appreciated by one of ordinary skill in the art in view of this disclosure, they may be used in other applications in which a protection circuit may be needed to prevent damage to sensitive electronic components.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

Figures 1, 2:
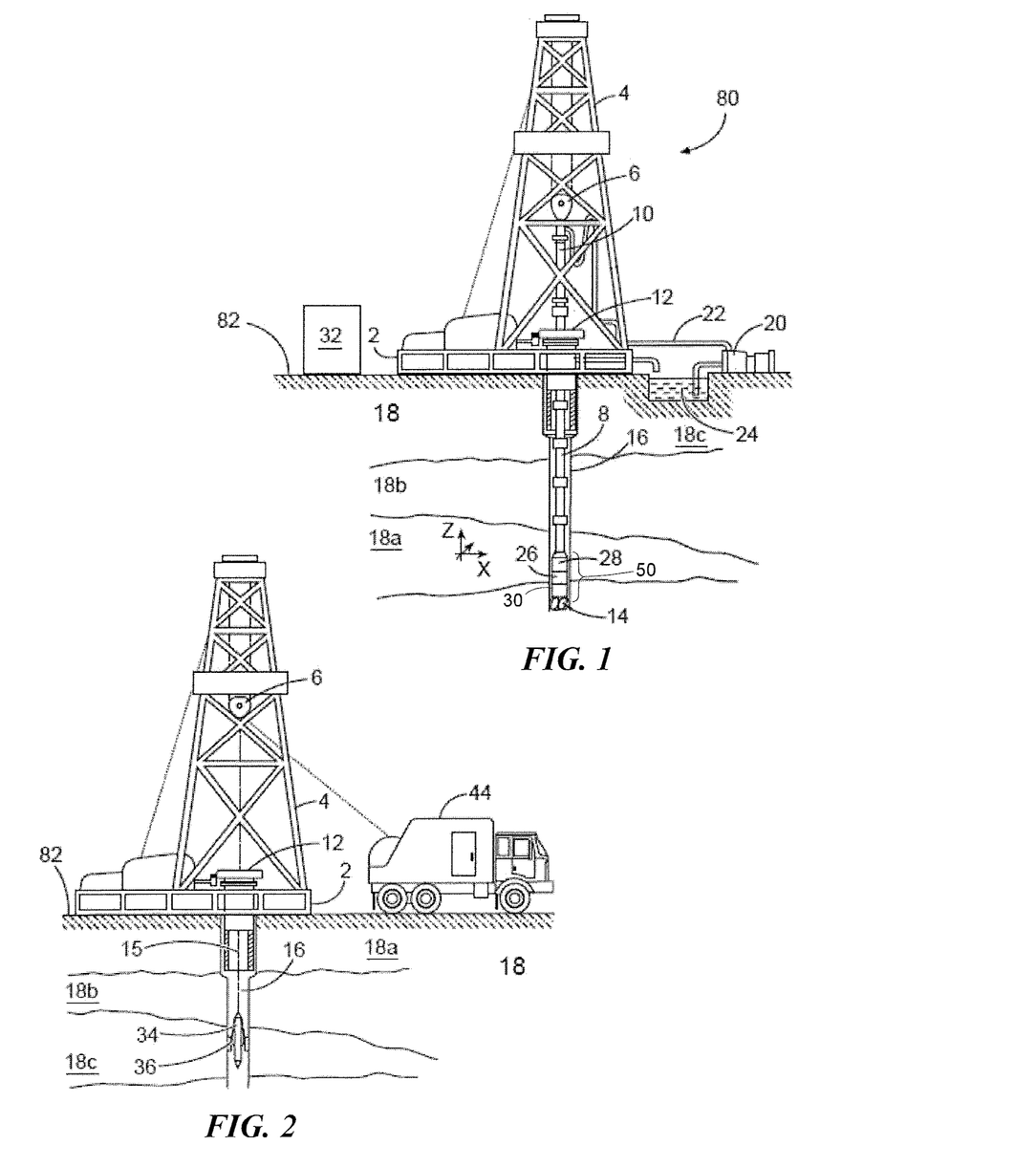
FIG. 1 illustrates an example subterranean drilling system in accordance with embodiments of the present disclosure.
FIG. 2 illustrates an example subterranean drilling system with the drill string removed in accordance with embodiments of the present disclosure.

FIG. 1 illustrates an example subterranean drilling system 80, according to aspects of the present disclosure. The drilling system 80 comprises a drilling platform 2 positioned at the surface 82. In the embodiment shown, the surface 82 comprises the top of a formation 18 containing one or more rock strata or layers 18a-c, and the drilling platform 2 may be in contact with the surface 82. In other embodiments, such as in an off-shore drilling operation, the surface 82 may be separated from the drilling platform 2 by a volume of water. The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) 50 coupled to the drill string 8 near the drill bit 14. The BHA 50 may comprise different combinations of drill collars; subs such as stabilizers, reamers, shocks, hole-openers; and various downhole tools, including, but not limited to, LWD/MWD systems, telemetry systems, downhole motors to drive the drill bit 14, and rotary steerable assemblies for changing the drilling direction of the drill bit 14. As depicted, the BHA 50 comprises LWD/MWD elements 26, telemetry element 28, and downhole power generator 30. As the bit 14 extends the borehole 16 through the formations 18, the LWD/MWD elements 26 may collect measurements relating to borehole 16. The LWD/MWD elements 26 may be communicably coupled to a telemetry element 28. The telemetry element 28 may transfer measurements from LWD/MWD elements 26 to a surface receiver 30 and/or to receive commands from the surface receiver 30 via a surface information handling system 32. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the LWD/MWD elements 26 may also be stored within the LWD/MWD elements 26 or the telemetry element 28 for later retrieval at the surface 82 by the information handling system 32.

Figure 3:
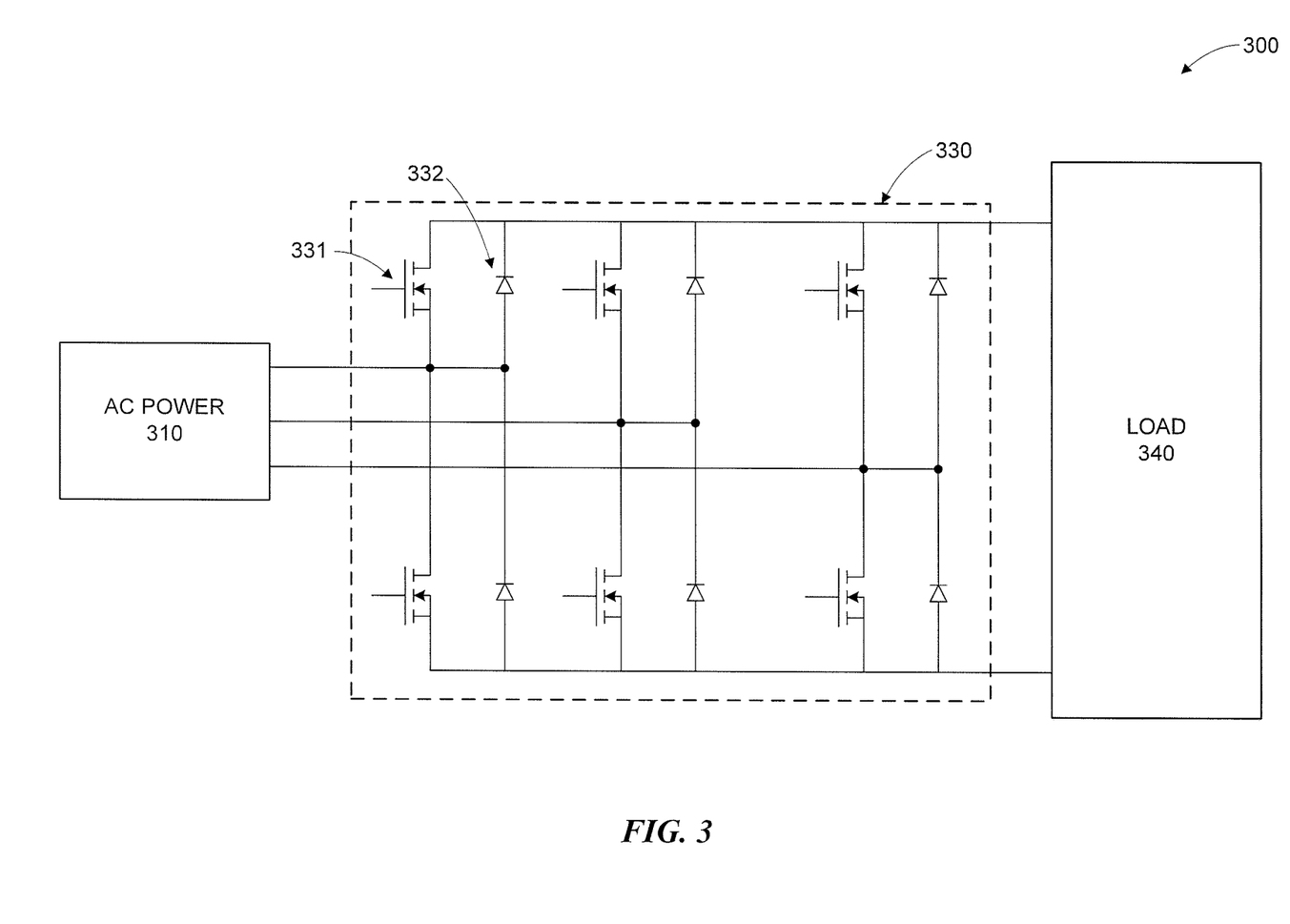
FIG. 3 illustrates an example downhole electronic circuit comprising an AC power source, an AC-DC converter circuit, and a load in accordance with embodiments of the present disclosure.

The downhole power generator 30 may be coupled and provide power to electronic components within the BHA 50, including electronic components within the LWD/MWD elements 26 and telemetry system 28. Example electronic components include, but are not limited to, sensors, control units, motors, and solenoids. The downhole power generator 30 may comprise one or more alternators and associated circuitry to generate AC output signals that are then converted to provide DC power, as shown in FIG. 3, to the BHA 50 and electrical components thereof. The generator 30 may generate power based on the operation of drill string 8, or based on the flow of drilling fluid through components of drilling system 80. The amount of power provided by the generator 30 may depend, in part, on the power requirements of the electronic components in the BHA 50, the number of alternators within the generator 30, and the power ratings of the electronic components within the generator 30. In certain embodiments, as will be described in detail below, one or more protection circuits may be included in the generator 30 to avoid damage to electronic components caused by harsh downhole conditions. The number and arrangement of alternators may depend, in part, on the configuration of the generator 30 and the voltage requirements of the BHA 50.

At various times during the drilling process, the drill string 8 may be removed from the borehole 16 as shown in FIG. 2. Once the drill string 8 has been removed, measurement/logging operations can be conducted using a wireline tool 34, i.e., an instrument that is suspended into the borehole 16 by a cable 15 having conductors for transporting power to the tool from a surface power source (e.g., a thermoelectric power generator, not shown), and telemetry from the tool body to the surface 102. The power transported from the surface may comprise AC power, for instance, that is converted to DC power downhole, or it may comprise DC power that is transmitted from the surface. The wireline tool 34 may comprise electronic components similar to the electronic components described above. For instance, the wireline tool 34 may comprise logging and measurement elements 36, similar to the LWD/MWD elements of BHA 50 described above, which may comprise one or more electronic components in the form of sensors and controllers. The elements 36 may be communicatively coupled to the cable 15. A logging facility 44 (shown in FIG. 2 as a truck, although it may be any other structure) may collect measurements from the tool 36, and may include computing facilities (including, e.g., a control unit/information handling system) for controlling, processing, storing, and/or visualizing the measurements gathered by the elements 36. The computing facilities may be communicatively coupled to the elements 36 by way of the cable 15. In certain embodiments, the control unit 32 may serve as the computing facilities of the logging facility 44.

Modifications, additions, or omissions may be made to FIGS. 1-2 without departing from the scope of the present disclosure. For instance, FIGS. 1-2 illustrate components of subterranean drilling system 80 in a particular configuration. As an example, the position of the generator 30 within the BHA 50 and the system 80 may differ from the embodiment depicted. It will be understood that any suitable configuration of components for logging a wellbore may be used. Furthermore, fewer components or additional components beyond those illustrated may be included in subterranean drilling system 80 without departing from the scope of the present disclosure.

Power converters may be used in the example power generators described above, as well as power generators used in other capacities, and in downhole applications can be single-phase, three-phase, or multi-phase, and may include rectifiers or inverters. In certain embodiments, this may include a three-phase active rectifier or a diode bridge rectifier fed by an alternating current (AC) generator, which in turn supplies an electronic load comprising one or more electronic elements. FIG. 3 illustrates an example downhole electronic circuit 300 comprising an AC power source 310, an AC-DC converter circuit 330, and a load 340 in accordance with embodiments of the present disclosure. The power from AC power source 310 may be generated by a power source located on a drill string (e.g., power generator 30) in LWD/MWD embodiments, for example, or from a surface power source (e.g., a thermoelectric power generator) in wireline embodiments. The power from AC power source 310 may be three-phase AC power as shown in FIG. 3. The AC-DC converter circuit 323 may convert the AC power received from the AC power source 310 into a DC voltage output. AC-DC converter circuit 330 may comprise an active rectifier circuit as shown in FIG. 3, which includes switching devices 331 and diodes 332 connected in parallel with one another as shown. Switching devices 331 may include any suitable switching device such as junction gate field-effect transistors (JFETs), metal-oxide-semiconductor field-effect transistors (MOSFETs), insulated-gate bipolar transistors (IGBTs), bi-polar junction transistors (BJTs), or silicon-controlled rectifiers (SCRs). In certain embodiments, diodes 332 may be built into or be a component of the switching device 331 (e.g., a body diode) with which it is connected in parallel. The DC output voltage from the AC-DC converter circuit 330 may then be provided to a load 340, which may include one or more electrical components of a subterranean drilling system (e.g., subterranean drilling system 80 of FIGS. 1-2). In certain embodiments, a capacitor bank may be disposed between the AC-DC converter circuit 330 and load 340, to protect against variations in the DC output voltage provided to load 340.

Modifications, additions, or omissions may be made to FIG. 3 without departing from the scope of the present disclosure. For example, while FIG. 3 illustrates a three-phase downhole electronic circuit 300, it will be understood that downhole electronic circuit 300 may be single-phase, down-phase, or multi-phase. As another example, AC-DC converter circuit 320 may comprise a diode bridge rectifier circuit or Vienna rectifier circuit rather than an active rectifier circuit as illustrated. Furthermore, fewer components or additional components beyond those illustrated may be included in downhole electronic circuit 300 without departing from the scope of the present disclosure.

Due to harsh downhole conditions, various fault events at the power source 310 can arise during use. These fault events include, but are not limited to, overvoltage events on alternator terminals, alternator faults, turbine-alternator coupling failures, and over-temperature situations. Fault events can also occur in the converter circuit 330 and load 340. One or more components of downhole electronic circuit 300 may be susceptible to damage or destruction caused by the fault events. For example, alternator overvoltage events may cause damage to one or more of switching devices 331, diodes 332, or components of load 340. A protection circuit may be used to limit or prevent damage to the electronic components of the circuit 300.

Figure 4A:
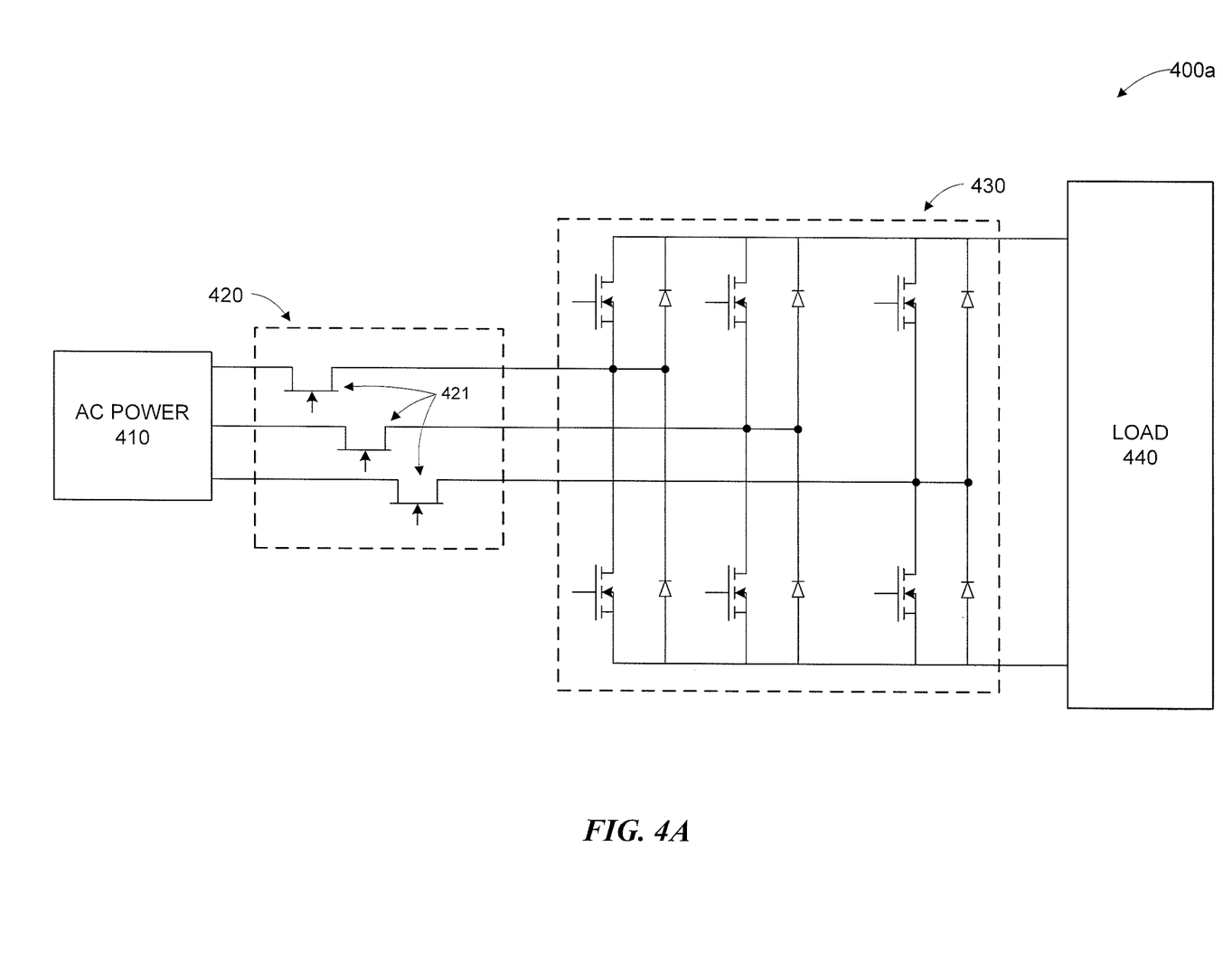
FIGS. 4A-4C illustrate example downhole electronic circuits comprising a protection circuit disposed between an AC power source and an AC-DC converter circuit in accordance with embodiments of the present disclosure.
Figure 4B:
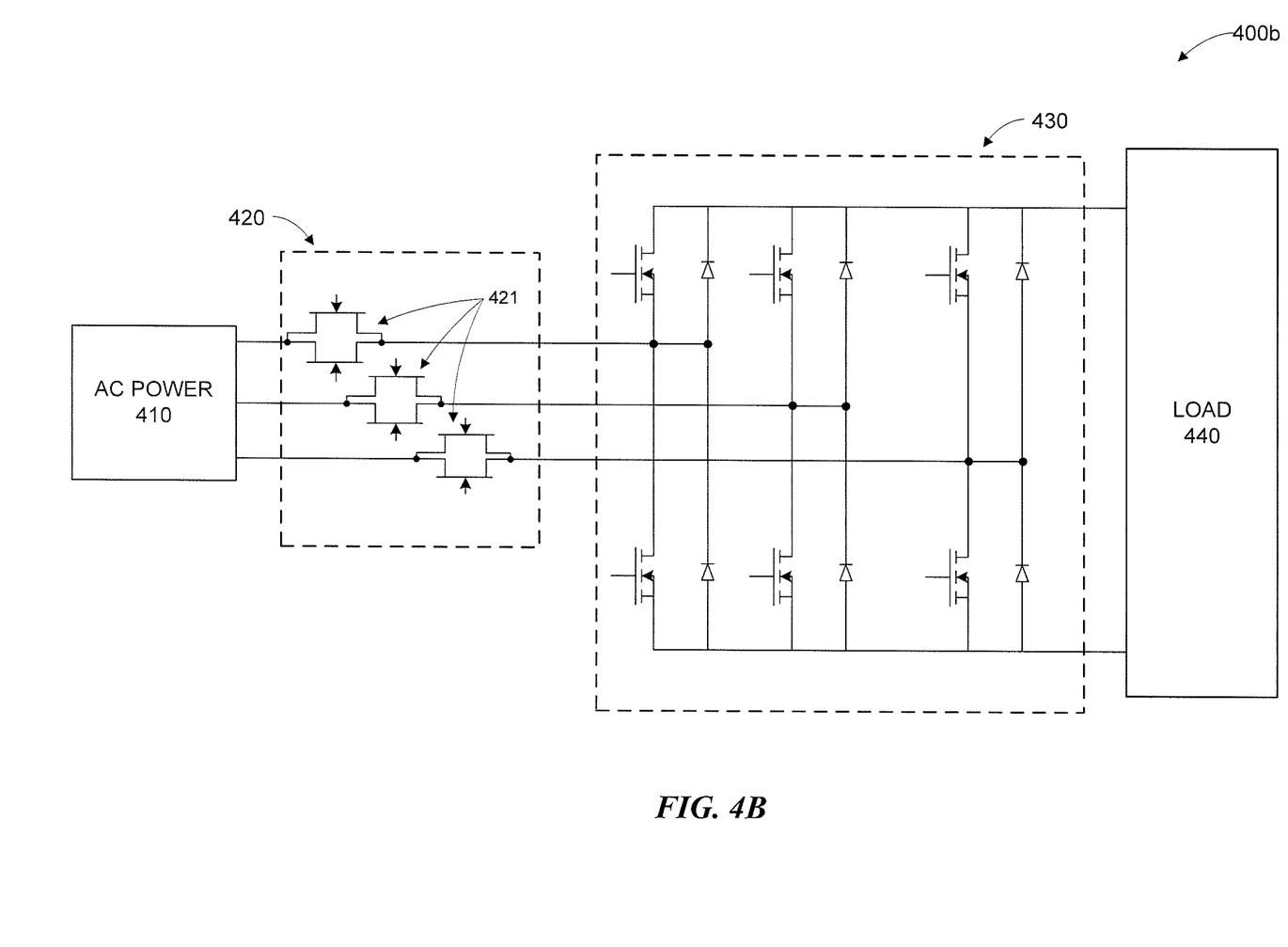
Figure 4C:
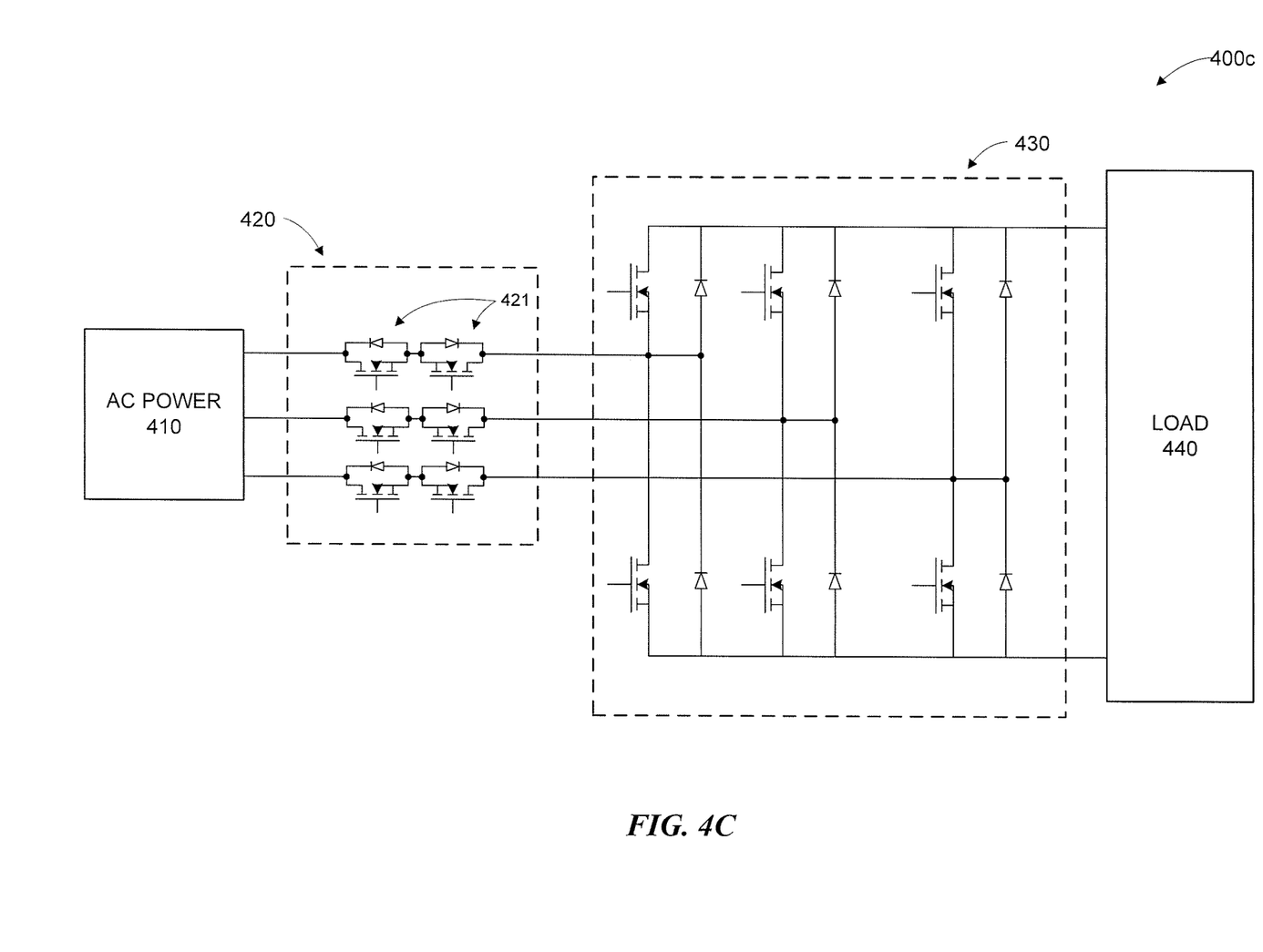

FIGS. 4A-4C illustrate example downhole electronic circuits 400 comprising protection circuits 420 disposed between an AC power source 410 and an AC-DC converter circuit 430 in accordance with embodiments of the present disclosure. Similar to circuit 300 of FIG. 3, the power from AC power source 410 may be generated by a power source located on a drill string (e.g., generator 30) in LWD/MWD embodiments, for example, or from a surface power source (e.g., a thermoelectric power generator) in wireline embodiments. The power from AC power source 410 may be three-phase AC power as shown in FIGS. 4A-4C. The AC-DC converter circuit 430 may convert the AC power received (via protection circuit 420) from the AC power source 410 into a DC voltage output. AC-DC converter circuit 430 may comprise an active rectifier circuit as shown in FIGS. 4A-4C, which includes switching devices and diodes connected in parallel with one another similar to switching devices 331 and diodes 332 of FIG. 3. However, it will be understood that in certain embodiments, AC-DC converter circuit 430 may comprise a diode bridge rectifier circuit or a Vienna rectifier circuit. The switching devices in the active rectifier circuit of AC-DC converter circuit 430 may include any suitable switching device, including MOSFETs, IGBTs, JFETs, BJTs, or SCRs. In certain embodiments, the diodes may be built into or be a component of the switching device (e.g., a body diode). The DC output voltage from the AC-DC converter circuit 430 may then be provided to load 440, which may include one or more electrical components of a subterranean drilling system (e.g., subterranean drilling system 80 of FIGS. 1-2). In certain embodiments, a capacitor bank may be disposed between the AC-DC converter circuit 430 and load 440, to protect against variations in the DC output voltage provided to load 440.

As depicted, the protection circuit 420 includes at least three blocking devices 421 (which may also be referred to as reverse blocking devices) for three-phase power embodiments, as shown. In some embodiments, blocking devices 421 may include individual SiC JFETs for each phase of the input power (e.g., three for three-phase power) as shown in FIG. 4A. When used in an individual arrangement such as that shown in FIG. 4A, blocking devices 421 may conduct and block (i.e., not conduct) current in both directions, which is why SiC JFETs may be chosen for use as blocking devices 421 in such embodiments. In other embodiments, additional anti-parallel JFET blocking devices 421 may be added in parallel for each phase, as shown in FIG. 4B) to improve performance in the reverse conduction direction (i.e., right to left with reference to FIG. 4B). In such embodiments, it may not be necessary for blocking devices 421 to both conduct and block (i.e., not conduct) current in both directions since the devices are stacked. Protection circuit 420 may also be implemented using MOSFETs in series with one another (i.e., in an anti-serial configuration) as blocking devices 421, as shown in FIG. 4C, which may exhibit blocking characteristics when turned off and may exhibit bidirectional conduction when turned on. As with the blocking devices 421 of FIG. 4B, it may not be necessary for blocking devices 421 to both conduct and block (i.e., not conduct) current in both directions since the devices are in series with one another.

In operation, a control configuration (such as that illustrated in FIG. 6 and described further below) may be used to switch blocking devices 421 on and off based on the detection of one or more faults. For example, blocking devices 421 may be controlled to be open (i.e., not conduct) during the presence of a fault condition detected by one or more sensors, such as an alternator over- or under-speed event. In the event of a fault condition, therefore, protection circuit 420 may block or prevent AC power from the AC power source 410 from being transmitted through AC-DC converter circuit 430 toward load 440. This blocking may prevent damage or destruction to the electrical components of AC-DC converter circuit 430 and/or load 440 that would otherwise be caused by the fault condition.

Modifications, additions, or omissions may be made to FIGS. 4A-4C without departing from the scope of the present disclosure. For example, while FIGS. 4A-4C illustrate protection circuits 420 that include SiC JFETs and anti-serial MOSFETS, it will be understood that any conventional active devices in a reverse blocking configuration may be used. As another example, AC-DC converter circuits 420 may comprise diode bridge rectifier circuits or Vienna rectifier circuits rather than active rectifier circuits as illustrated. In addition, although downhole electronic circuits 400 are illustrated as three-phase circuits, it will be understood that downhole electronic circuits 400 may be single-phase, down-phase, or multi-phase. Furthermore, fewer components or additional components beyond those illustrated may be included in downhole electronic circuits 400 without departing from the scope of the present disclosure. For example, a capacitor bank may be disposed between AC-DC converter circuit 430 and load 440 in certain embodiments to protect against variations in the DC output voltage provided to load 440.

Figure 5A:
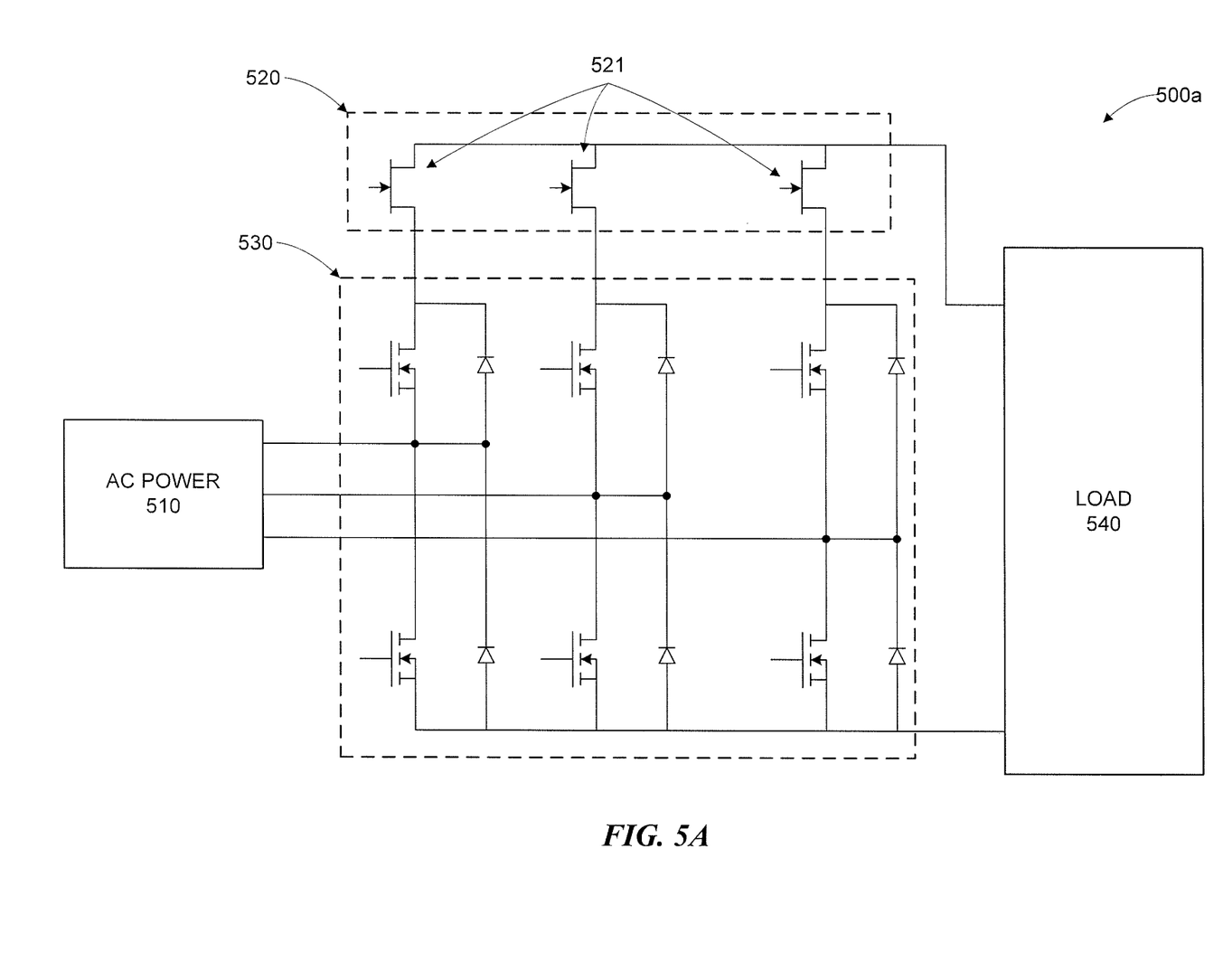
FIGS. 5A-5B illustrate example downhole electronic circuits comprising a protection circuit in series with portions of an AC-DC converter circuit in accordance with embodiments of the present disclosure.
Figure 5B:
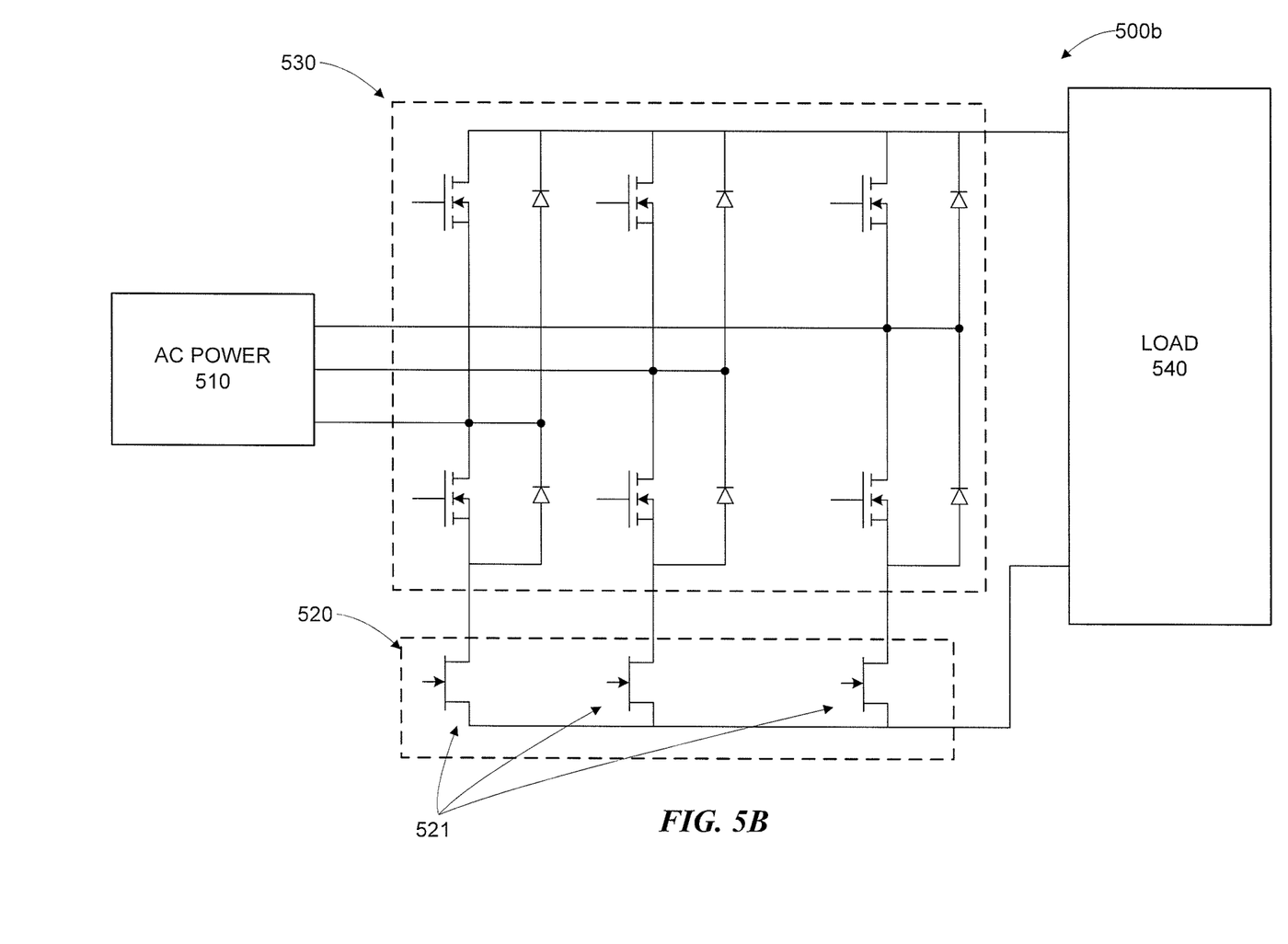

FIGS. 5A-5B illustrate example downhole electronic circuits 500 comprising protection circuits 520 in series with portions of AC-DC converter circuits 530 in accordance with embodiments of the present disclosure. The power from AC power source 510 may be generated by a power source located on a drill string (e.g., generator 30) in LWD/MWD embodiments, for example, or from a surface power source (e.g., a thermoelectric power generator) in wireline embodiments. The power from AC power source 510 may be three-phase AC power as shown in FIGS. 5A-5B. The AC-DC converter circuit 530 may convert the AC power received from the AC power source 510 into a DC voltage output. AC-DC converter circuit 530 may comprise an active rectifier circuit as shown in FIGS. 5A-5B, which includes switching devices and diodes connected in parallel with one another similar to switching devices 331 and diodes 332 of FIG. 3. However, it will be understood that in certain embodiments, AC-DC converter circuit 530 may comprise a diode bridge rectifier circuit or a Vienna rectifier circuit. The switching devices in the active rectifier circuit of AC-DC converter circuit 530 may include any suitable switching device, including MOSFETs, IGBTs, JFETs, BJTs, or SCRs. In certain embodiments, the diodes may be built into or be a component of the switching device (e.g., a body diode). The DC output voltage from the AC-DC converter circuit 530 may then be provided to load 540, which may include one or more electrical components of a subterranean drilling system (e.g., subterranean drilling system 80 of FIGS. 1-2). In certain embodiments, a capacitor bank may be disposed between the AC-DC converter circuit 530 and load 540, to protect against variations in the DC output voltage provided to load 540.

Protection circuits 520 include at least three blocking devices 521 for three-phase power embodiments (i.e., one blocking device 521 per phase of the AC power source 510), similar to blocking devices 421 of FIGS. 4A-4C. In contrast, however, blocking devices 521 of FIGS. 5A-5B are disposed in in each branch of AC-DC converter circuits 530, and in series with one or more components of the branch of AC-DC converter circuits 530 (e.g., in series with the switching devices of AC-DC converter circuit 530). In certain embodiments, blocking devices 521 may be disposed above (relative to the circuits 500 illustrated) the components of AC-DC converter circuits 530 as shown in FIG. 5A. In other embodiments, however, blocking devices 521 may be disposed below (relative to the circuits 500 illustrated) the AC-DC converter circuits 530 as shown in FIG. 5B. Blocking devices 521 may comprise reverse blocking devices (e.g., SiC JFETs) in particular embodiments, which may allow for the use of fewer blocking devices since such devices block current in both directions. Although illustrated as JFETs in FIGS. 5A-5B, it will be understood that blocking devices 521 may comprise any suitable reverse blocking switching device. Furthermore, although illustrated with reverse blocking switching devices, it will also be understood that protection circuits 520 may comprise any suitable active blocking devices configured in a reverse blocking configuration, such as parallel active devices as shown in FIG. 4B or anti-serial MOSFETs as shown in FIG. 4C. In certain embodiments, blocking devices 521 may be normally-on devices (i.e., conducting current when driven with a gate voltage and blocking when the gate voltage is zero or near-zero).

In operation, blocking devices 521 may be configured to bock current flow in AC-DC converter circuit 530 (i.e., disconnect the active bridge rectifier circuit) when switched. Blocking devices may be configured to be switched by an information handling system based on measurements from one or more downhole sensors (e.g., measurements that indicate a fault condition or potential fault condition), as described further below. Accordingly, components of AC-DC converter circuit 530 and load 540 may be disconnected from the AC power source 510 in the event of a fault condition. Because the main bridge components of the active bridge rectifier circuit of AC-DC converter circuit 530 will cause opposite current flows in each half of each branch of the active rectifier circuit, the configuration of blocking devices 521 may need to be a reverse blocking configuration (i.e., able to conduct and block current in both directions). For example, as shown in FIGS. 5A-5B, bi-directional SiC JFETs may be used as blocking devices 521 for each phase of the rectifier circuit. As another example, two uni-directional devices in parallel with one another (similar to FIG. 4B) may be used as blocking devices 521. As yet another example, MOSFETs in an anti-serial configuration (similar to FIG. 4C) may be used as blocking devices 521. In embodiments with diode bridge rectifier circuits, however, a reverse blocking configuration may not be necessary since the diodes cause uni-directional current flows in each half of each branch of the rectifier circuit. Thus, blocking devices 521 in such embodiments may be either uni-directional or bi-directional.

Modifications, additions, or omissions may be made to FIGS. 5A-5B without departing from the scope of the present disclosure. For example, while FIGS. 5A-5B illustrate protection circuits 520 that include SiC JFETs, it will be understood that any conventional active devices in a reverse blocking configuration may be used. As another example, AC-DC converter circuits 530 may comprise diode bridge rectifier circuits rather than active rectifier circuits as illustrated. In addition, although downhole electronic circuits 500 are illustrated as three-phase circuits, it will be understood that downhole electronic circuits 500 may be single-phase or down-phase. Furthermore, fewer components or additional components beyond those illustrated may be included in downhole electronic circuits 500 without departing from the scope of the present disclosure. For example, a capacitor bank may be disposed between AC-DC converter circuit 530 and load 540 in certain embodiments to protect against variations in the DC output voltage provided to load 540.

Figure 6A:
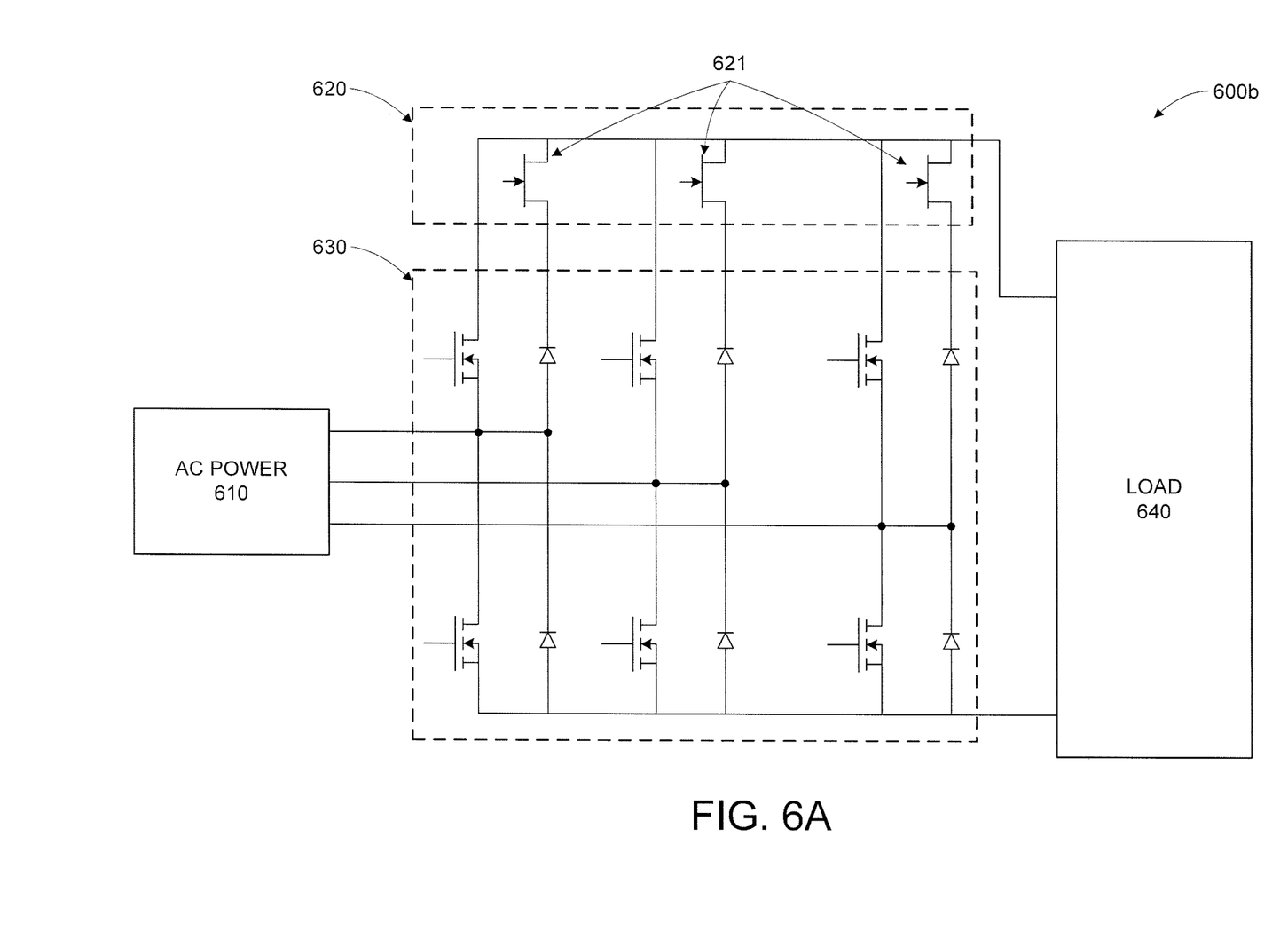
FIGS. 6A-6B illustrate additional example downhole electronic circuits comprising a protection circuit in series with portions of an AC-DC converter circuit in accordance with embodiments of the present disclosure.
Figure 6B:
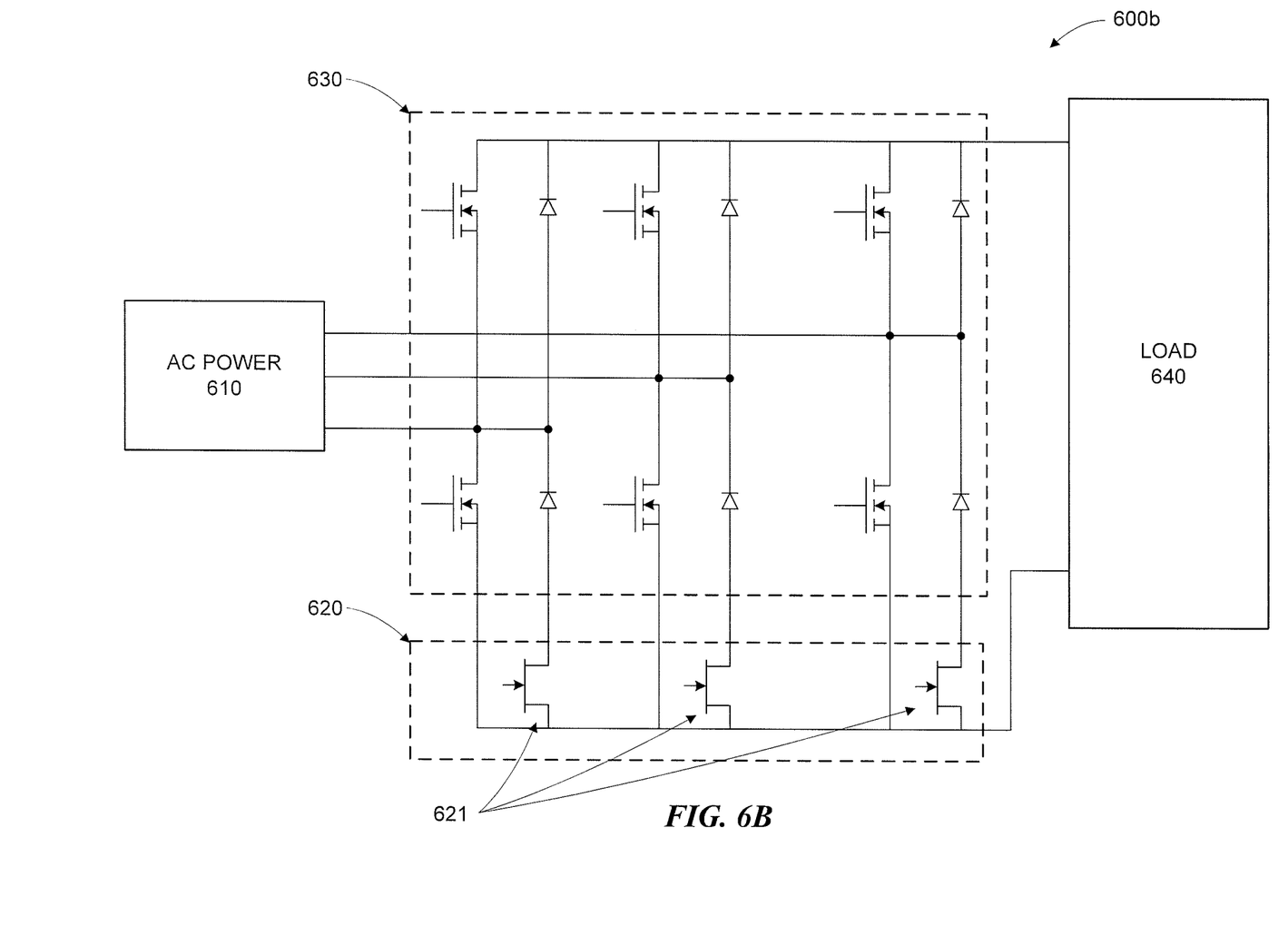

FIGS. 6A-6B illustrate additional example downhole electronic circuits 600 comprising protection circuits 520 in series with portions of AC-DC converter circuits 530 in accordance with embodiments of the present disclosure. The power from AC power source 610 may be generated by a power source located on a drill string (e.g., generator 30) in LWD/MWD embodiments, for example, or from a surface power source (e.g., a thermoelectric power generator) in wireline embodiments. The power from AC power source 610 may be three-phase AC power as shown in FIGS. 6A-6B. The AC-DC converter circuit 630 may convert the AC power received from the AC power source 610 into a DC voltage output. AC-DC converter circuit 630 may comprise an active rectifier circuit as shown in FIGS. 6A-6B, which includes switching devices and freewheeling diodes (i.e., not body diodes) connected in parallel with one another. The switching devices in the active rectifier circuit of AC-DC converter circuit 630 may include any suitable switching device, including MOSFETs, IGBTs, JFETs, BJTs, or SCRs.

The DC output voltage from the AC-DC converter circuit 630 may then be provided to load 640, which may include one or more electrical components of a subterranean drilling system (e.g., subterranean drilling system 80 of FIGS. 1-2). In certain embodiments, a capacitor bank may be disposed between the AC-DC converter circuit 630 and load 640, to protect against variations in the DC output voltage provided to load 640.

Protection circuits 620 include at least three blocking devices 621 for three-phase power embodiments (i.e., one blocking device 621 per phase of the AC power source 610), similar to blocking devices 521 of FIGS. 5A-5B. In contrast, however, blocking devices 621 of FIGS. 6A-6B are disposed in series with the freewheeling diodes in each branch of AC-DC converter circuits 630. In certain embodiments, blocking devices 521 may be disposed above (relative to the circuits 600 illustrated) the components of AC-DC converter circuits 630 as shown in FIG. 6A. In other embodiments, however, blocking devices 621 may be disposed below (relative to the circuits 600 illustrated) the AC-DC converter circuits 630 as shown in FIG. 6B. Blocking devices 621 may comprise reverse blocking devices (e.g., SiC JFETs) in particular embodiments, which may allow for the use of fewer blocking devices since such devices block current in both directions. Although illustrated as JFETs in FIGS. 6A-6B, it will be understood that blocking devices 621 may comprise any suitable reverse blocking switching device. Furthermore, although illustrated with reverse blocking switching devices, it will also be understood that protection circuits 520 may comprise any suitable active blocking devices configured in a reverse blocking configuration, such as parallel active devices as shown in FIG. 4B or anti-serial MOSFETs as shown in FIG. 4C. However, because blocking devices 621 are coupled to the freewheeling diodes and not the switching devices of AC-DC converter circuit, blocking devices 521 may also be uni-directional since the freewheeling diodes cause uni-directional current flows in each half of each branch of the rectifier circuit. In certain embodiments, blocking devices 621 may be normally-on devices (i.e., conducting current when driven with a gate voltage and blocking when the gate voltage is zero or near-zero).

In operation, blocking devices 621 may be configured to bock current flow in the freewheeling diodes of AC-DC converter circuit 630 when switched. Because only the freewheeling diodes of the active bridge rectifier circuit of AC-DC converter circuit 630, the switching devices of AC-DC converter circuit 630 must be switched in synchronization with blocking devices 621 Furthermore, the switching devices of AC-DC converter circuit 630 must have no body diode or have their body diode behavior disabled through the inclusion of additional diodes in AC-DC converter circuit 630. Blocking devices 621 and the switching devices of the AC-DC converter circuit 630 may be configured to be switched by an information handling system based on measurements from one or more downhole sensors (e.g., measurements that indicate a fault condition or potential fault condition), as described further below. Accordingly, components of AC-DC converter circuit 630 and load 640 may be disconnected from the AC power source 610 in the event of a fault condition.

Modifications, additions, or omissions may be made to FIGS. 6A-6B without departing from the scope of the present disclosure. For example, while FIGS. 6A-6B illustrate protection circuits 620 that include SiC JFETs, it will be understood that any conventional active switching devices may be used. In addition, although downhole electronic circuits 600 are illustrated as three-phase circuits, it will be understood that downhole electronic circuits 600 may be single-phase or down-phase. Furthermore, fewer components or additional components beyond those illustrated may be included in downhole electronic circuits 500 without departing from the scope of the present disclosure. For example, a capacitor bank may be disposed between AC-DC converter circuit 630 and load 640 in certain embodiments to protect against variations in the DC output voltage provided to load 640.

Figure 7:
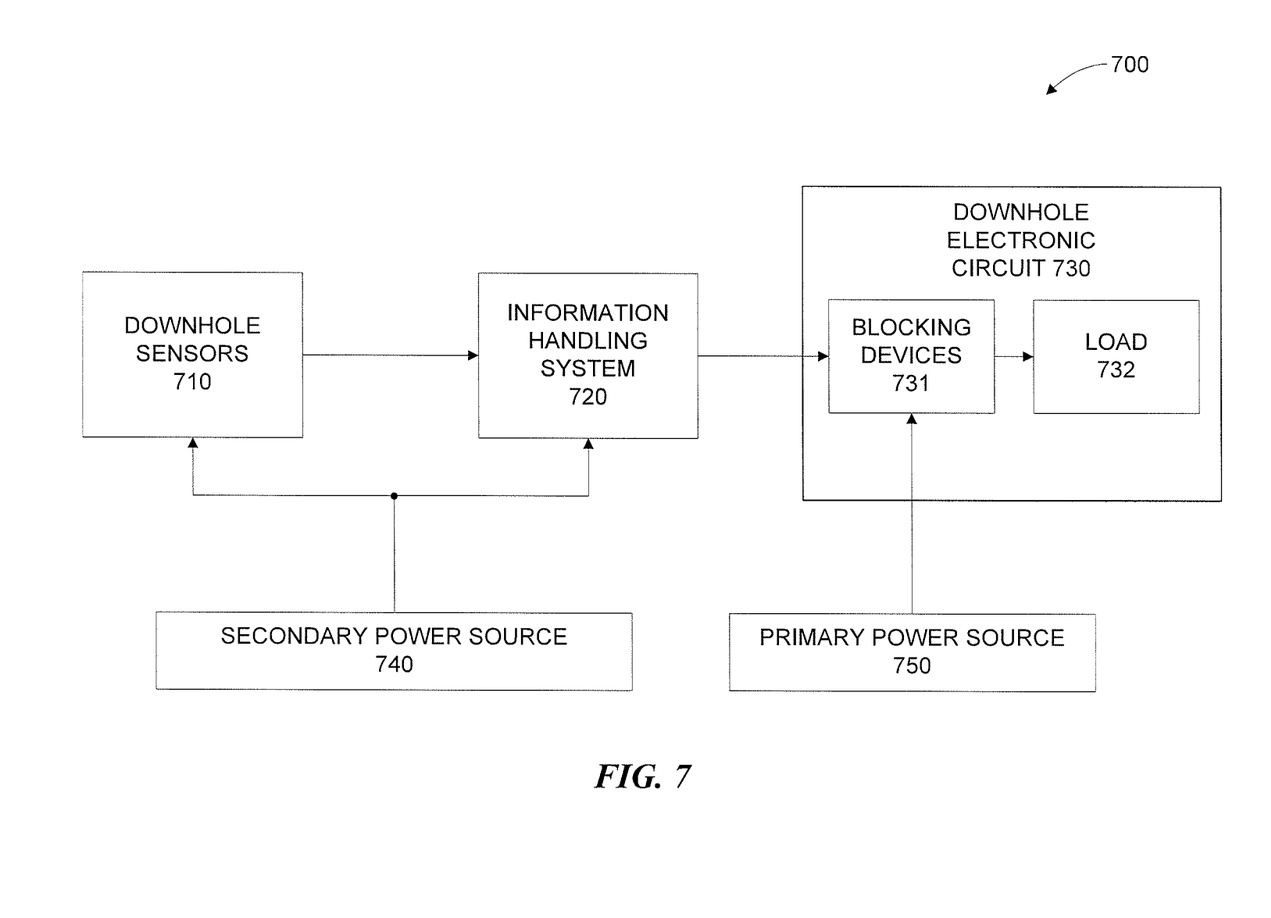
FIG. 7 illustrates an example control configuration for protection circuits in accordance with embodiments of the present disclosure.

FIG. 7 illustrates an example control configuration 700 for protection circuits (e.g., protection circuits 400 of FIGS. 4A-4C, protection circuits 500 of FIGS. 5A-5B, and protection circuits 600 of FIGS. 6A-6B) in accordance with embodiments of the present disclosure. Control configuration 700 comprises an information handling system 720 communicably coupled to downhole sensors 710 and blocking devices 731 of a downhole electronic circuit 730. The information handling system 720 may comprise a processor and a memory device coupled to the processor. In certain embodiments, information handling system 720 may comprise microprocessors, microcontrollers, digital signal processors (DSP), application specific integrated circuits (ASIC), or any other digital or analog circuitry configured to interpret and/or execute program instructions and/or process data. Downhole sensors 710 may include any suitable sensor for measuring characteristics associated with components of systems of the present disclosure. For example, downhole sensors 710 may include sensors for measuring currents and/or voltages (e.g., for an AC power source such as an alternator), alternator speeds for a power source, ambient downhole temperatures, temperatures of electronic devices (e.g., power source devices, blocking devices, or load devices), and the like. Blocking devices 731 may include blocking devices coupled to portions of downhole electronic circuit 730 (e.g., blocking devices 421 of FIGS. 4A-4C, blocking devices 521 of FIGS. 5A-5B, and blocking devices 621 of FIGS. 6A-6B) that are configured to block current flow into load 732 of downhole electronic circuit 730 when switched.

In operation, information handling system 720 may receive measurements from downhole sensors 710 and compare the received measurements with one or more thresholds and switch blocking devices 731 on and off accordingly. For example, if measurements indicating a potential fault event at a power source (e.g., an over-speed event at an alternator or high or low input currents from the power source) are detected (e.g., the measurements are greater than a certain threshold), then information handling system 720 may send an appropriate signal to blocking devices 731 in order to cause blocking devices 731 to block (i.e., not conduct) power from primary power source 750 from reaching load 732 of downhole electronic circuit 730. The thresholds and fault conditions may be determined, for instance, with knowledge of the power generation circuitry and its tolerances, and may be stored at the information handling system 720 for real time comparison to the measurements received at the information handling system 720 from the sensors 710. Based on the comparison, the information handling system 720 may generate the necessary control signals to block and/or allow current. If blocking devices 730 are normally-on devices, for instance, then a zero voltage signal may be sent to blocking devices 730 from information handling system 720. When later measurements are detected indicating that the fault condition is no longer present (e.g., the measurement is below the certain threshold), then information handling system 720 may send an appropriate signal to blocking devices 730 in order to cause blocking devices 730 to allow (i.e., conduct) power from primary power source 750 to reach load 732 of downhole electronic circuit 730. If blocking devices 730 are normally-on devices, for instance, then an appropriate gate bias voltage signal may be sent to blocking devices 730 from information handling system 720.

In particular embodiments, the downhole sensors 710 and/or information handling system 720 may be powered by a secondary power source 740 that is different from the primary power source 750 that provides power to downhole electronic circuit 730, thereby allowing monitoring of sensors 710 and the switching of blocking devices 731 at all times.

Modifications, additions, or omissions may be made to FIG. 7 without departing from the scope of the present disclosure. For instance, FIG. 7 illustrates components of control configuration 700 in a particular configuration. However, it will be understood that any suitable configuration of components for controlling protection circuits in accordance with the present disclosure may be used. Furthermore, fewer components or additional components beyond those illustrated may be included in control configuration 700 without departing from the scope of the present disclosure.

To provide illustrations of one or more embodiments of the present disclosure, the following examples are provided.

In one embodiment, an example system comprises a power source providing an alternating current (AC) output, a converter circuit that receives the AC output from the downhole power source and provides a direct current (DC) output, an electrical component that is coupled to and receives the DC output from the converter circuit, a protection circuit coupled to the converter circuit, the protection circuit comprising one or more blocking devices configured to selectively block current flow in the converter circuit, and an information handling system communicably coupled to the blocking devices of the protection circuit, wherein the information handling system switches the blocking devices based on measurements from one or more sensors coupled to the downhole power source, the converter circuit, the protection circuit, or the electrical component.

In one or more embodiments described in the preceding paragraph, the blocking devices are configured in a reverse blocking configuration.

In one or more embodiments described in the preceding two paragraphs, each of the blocking devices are operable to conduct current and block current in both directions.

In one or more embodiments described in the preceding three paragraphs, the blocking devices comprise at least one of junction gate field-effect transistors (JFETs) and metal-oxide semiconductor field-effect transistors (MOSFETs).

In one or more embodiments described in the preceding four paragraphs, the blocking devices are silicon carbine (SiC) JFETs.

In one or more embodiments described in the preceding five paragraphs, the protection circuit comprises at least one blocking device per phase of the downhole power source.

In one or more embodiments described in the preceding six paragraphs, the protection circuit is disposed between the downhole power source and the converter circuit.

In one or more embodiments described in the preceding seven paragraphs, the blocking devices of the protection circuit are either disposed between the power source and the converter circuit or disposed in series with one or more components in each branch of the converter circuit.

In one or more embodiments described in the eight twelve paragraphs, the converter circuit is one of an active bridge rectifier circuit, a diode bridge rectifier circuit, and a Vienna rectifier circuit.

In one or more embodiments described in the preceding nine paragraphs, the downhole power source is disposed either within a bottom hole assembly of the subterranean drilling assembly or at the surface of the subterranean drilling assembly.

In one or more embodiments described in the preceding ten paragraphs, the measurements from one or more sensors comprise a current of the AC output, a voltage of the AC output, a speed of an alternator of the downhole power source, an ambient temperature, a temperature of a component of downhole power source, the converter circuit, the protection circuit, or the electrical component, or any combination thereof.

In one embodiment, an example method may comprise generating an alternating current (AC) output at a power source within a borehole in a subterranean formation; receiving at an electrical component a direct current (DC) output from a converter circuit coupled to the power source and the electrical component; receiving one or more measurements corresponding to the power source, the converter circuit, the electrical component, or a protection circuit coupled to the converter circuit; and selectively causing blocking devices within the protection circuit to block current flow in the converter circuit based, at least in part, on the one or more received measurements.

In one or more embodiments described in the preceding paragraph, the blocking devices are configured in a reverse blocking configuration.

In one or more embodiments described in the preceding two paragraphs, each of the blocking devices are operable to conduct current and block current in both directions.

In one or more embodiments described in the preceding three paragraphs, the blocking devices comprise at least one of junction gate field-effect transistors (JFETs) and metal-oxide semiconductor field-effect transistors (MOSFETs).

In one or more embodiments described in the preceding four paragraphs, the blocking devices are silicon carbine (SiC) JFETs.

In one or more embodiments described in the preceding five paragraphs, the protection circuit comprises at least one blocking device per phase of the downhole power source.

In one or more embodiments described in the preceding six paragraphs, the protection circuit is disposed between the downhole power source and the converter circuit.

In one or more embodiments described in the preceding seven paragraphs, the blocking devices of the protection circuit are either disposed between the power source and the converter circuit or disposed in series with one or more components in each branch of the converter circuit.

In one or more embodiments described in the eight twelve paragraphs, the converter circuit is one of an active bridge rectifier circuit, a diode bridge rectifier circuit, and a Vienna rectifier circuit.

In one or more embodiments described in the preceding nine paragraphs, the downhole power source is disposed either within a bottom hole assembly of the subterranean drilling assembly or at the surface of the subterranean drilling assembly.

In one or more embodiments described in the preceding ten paragraphs, the measurements from one or more sensors comprise a current of the AC output, a voltage of the AC output, a speed of an alternator of the downhole power source, an ambient temperature, a temperature of a component of downhole power source, the converter circuit, the protection circuit, or the electrical component, or any combination thereof.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

The terms "couple" or "couples" as used herein are intended to mean either an indirect or a direct connection. Thus, if a first device couples to a second device, that connection may be through a direct connection, or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "uphole" as used herein means along the drill string or the hole from the distal end towards the surface, and "downhole" as used herein means along the drill string or the hole from the surface towards the distal end.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

What is claimed is:

1. A system, comprising:
    a power source providing an alternating current (AC) output, wherein the power source is either disposed within a bottom hole assembly of a subterranean drilling assembly, or disposed at a surface of the subterranean drilling assembly;
    a converter circuit that receives the AC output from the power source and provides a direct current (DC) output, wherein the converter circuit comprises at least one switching device in parallel with at least one diode in each branch of the converter circuit;
    an electrical component that is coupled to and receives the DC output from the converter circuit;
    a protection circuit coupled to the converter circuit, the protection circuit comprising one or more blocking devices that selectively block current flow in the converter circuit, wherein each of the one or more blocking devices is in series with both the at least one diode and the at least one switching device in a branch of the converter circuit; and
    an information handling system communicably coupled to the blocking devices of the protection circuit, wherein the information handling system controls operation of the blocking devices based on measurements from one or more sensors coupled to the power source, the converter circuit, the protection circuit, or the electrical component,
    wherein when the measurements from the one or more sensors indicate a fault condition, the information handling system controls operation of the blocking devices in the protection circuit to disconnect the power source from the converter circuit.

2. The system of claim 1, wherein the blocking devices are configured in a reverse blocking configuration.

3. The system of claim 1, wherein each of the blocking devices are operable to conduct current and block current in both directions.

4. The system of claim 1, wherein the blocking devices comprise at least one of junction gate field-effect transistors (JFETs) and metal-oxide semiconductor field-effect transistors (MOSFETs).

5. The system of claim 4, wherein the blocking devices comprise silicon carbine (SiC) JFETs.

6. The system of claim 1, wherein the protection circuit comprises at least one blocking device per phase of the power source.

7. The system of claim 1, wherein the measurements from one or more sensors comprise a current of the AC output, a voltage of the AC output, a speed of an alternator of the power source, an ambient temperature, a temperature of a component of the power source, the converter circuit, the protection circuit, or the electrical component, or any combination thereof.

8. A method, comprising:
    generating an alternating current (AC) output at a power source, wherein the power source is either disposed within a bottom hole assembly of a subterranean drilling assembly, or disposed at a surface of the subterranean drilling assembly;

receiving at an electrical component a direct current (DC) output from a converter circuit coupled to the power source and the electrical component, wherein the converter circuit comprises at least one switching device in parallel with at least one diode in each branch of the converter circuit;

receiving one or more measurements corresponding to the power source, the converter circuit, the electrical component, or a protection circuit coupled to the converter circuit;

selectively causing blocking devices within the protection circuit to block current flow in the converter circuit based, at least in part, on the one or more received measurements, wherein each of the blocking devices is in series with both the at least one diode and the at least one switching device in a branch of the converter circuit; and when the measurements indicate a fault condition, causing the blocking devices within the protection circuit to disconnect the power source from the converter circuit.

9. The method of claim 8, wherein the blocking devices are configured in a reverse blocking configuration.

10. The method of claim 8, wherein each of the blocking devices are operable to conduct current and block current in both directions.

11. The method of claim 8, wherein the blocking devices comprise at least one of junction gate field-effect transistors (JFETs) and metal-oxide semiconductor field-effect transistors (MOSFETs).

12. The method of claim 11, wherein the blocking devices comprise silicon carbine (SiC) JFETs.

13. The method of claim 8, wherein the protection circuit comprises at least one blocking device per phase of the power source.

14. The method of claim 8, wherein the measurements from one or more sensors comprise a current of the AC output, a voltage of the AC output, a speed of an alternator of the power source, an ambient temperature, a temperature of a component of the power source, the converter circuit, the protection circuit, or the electrical component, or any combination thereof.

* * * * *